E. HUSON.
HORSE RAKE.
No. 62,034.
Patented Feb. 12, 1867
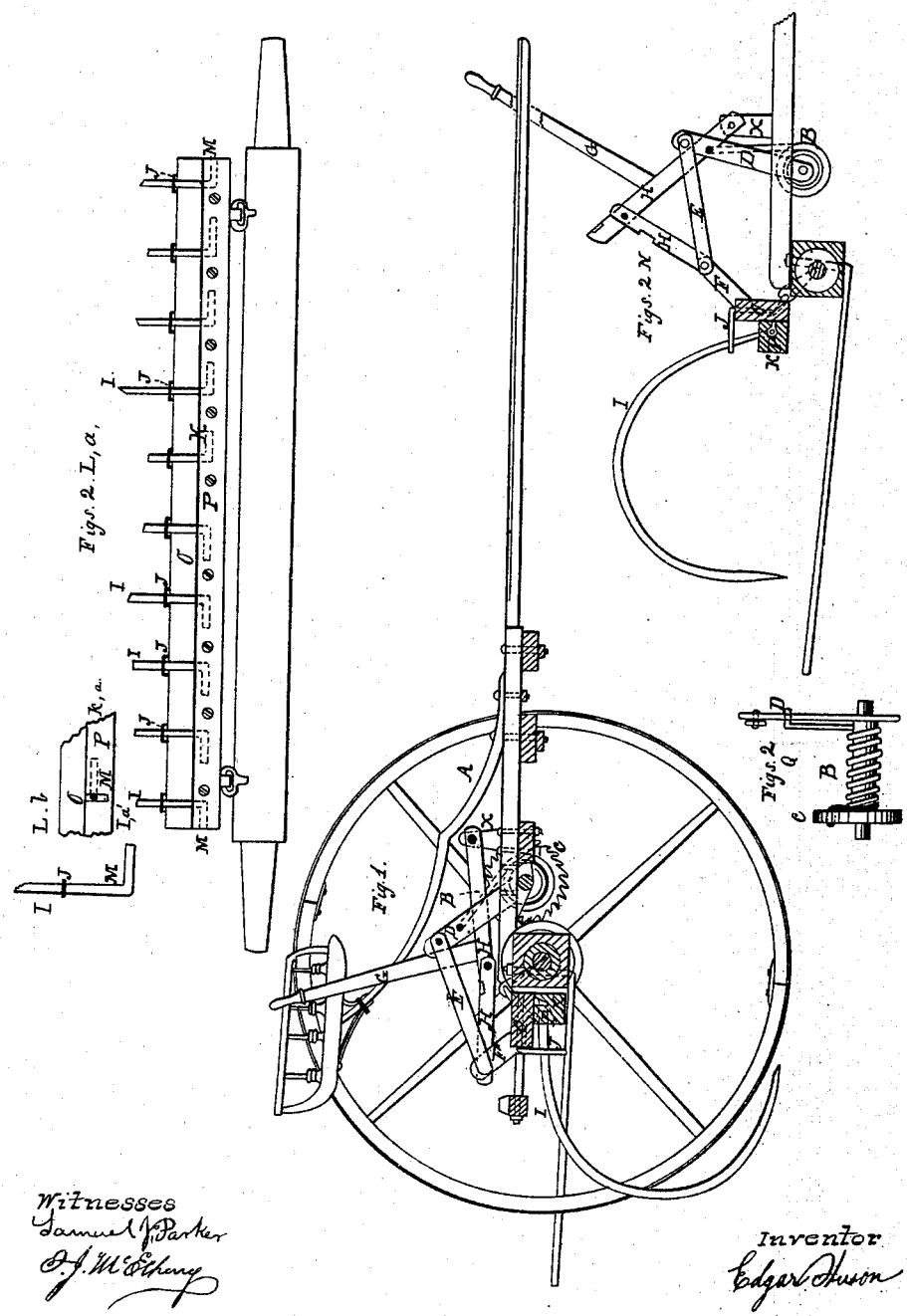
Witnesses
Samuel J. Parker
D. J. McElheny
Inventor
Edgar Huson

United States Patent Office.

EDGAR HUSON, OF ITHACA, NEW YORK.

Letters Patent No. 62,034, dated February 12, 1867.

IMPROVEMENT IN HORSE RAKES.

The Schedule referred to in these Letters Patent and making part of the same.

TO ALL WHOM IT MAY CONCERN:

Be it known that I, EDGAR HUSON, of Ithaca, Tompkins county, New York, have invented an Improvement in Horse Rakes; and I do hereby declare that the following is a full and exact description thereof, reference being had to the annexed drawings, and to the letters of reference marked thereon.

Figure 1 is a side profile view of my rake; and

Figure 2 parts thereof.

My objects are, first, to relieve the labor of unloading the rake; second, to fix the teeth while raking; and third, to simplify the hanging of the teeth. These I accomplish, first, by attaching to the wheeled carriage, in front of the axle, a spring, and so connecting it with a lever-rod and rake-head, that it relieves the manual labor of the operator; second, by fastening to the head lever and a stationary stud a jointed connecting-rod, so made that when the teeth are raking, the head of the rake and the teeth are fixed, and when the jointed rod is flexed the rake-head and teeth are released; third, by making the rake-head of two parts, one holding the staples and the other grooved, or with mortises or excavations in it, so that it shall recieve the head end of the teeth, which are bent at right angles to the main plane of the tooth; and thus a limited hinge is made, and the tooth has some play in the head so as to suit the roughnesses of the surfaces to be raked.

This is seen in the figures, where, in fig. 1, A is the carriage of the rake supported on its wheels with thills, driver's seat, and other appliances; the rake-head being hinged to the back part of the axle. And B is the spring on a shaft, and is tightened or relaxed by the ratchet-wheel C, one end of the spring being fixed in the ratchet and the other in the lever D, by which it operates the rake through the connecting-rod E, and head lever F. And G is the hand lever for the driver to load and unload the rake, when in his seat. This lever G is fixed to and part of the jointed connecting-rod H, the posterior part of which is hinged to the rake-head lever F, and the anterior part to the stud X. The teeth I are passed through the staples J, and enclosed in the two-parted head K. In fig. 2, at N, the spring lever D, and jointed-rod H H, and parts in contact with them, are seen flexed. At L, *a*, is seen the under side of the rake-head, and the teeth and the right-angled bending of them by the dotted lines M, which lie on the groove or excavations made for the semi-hinging of the teeth. At L, *b*, is the tooth I, bent at M for its hinging. And also in K, *a*, the back part of the rake-head, showing the tooth in a perpendicular slot in the rake-head, which allows the motion to fit the unevennesses of the surfaces to be raked. At Q is seen the spring B, on its shaft, and with its immediate connections. The use of the devices I have invented is apparent to those skilled in the art to which it appertains.

*Claim.*

1. I claim the spring B, anterior to the rake-head, for the purpose of relieving the labor of operating the rake, and also for the purpose of a quick upward motion of the teeth, so that the hay or other article raked shall not be bound, by the forward motion of the horse, between the teeth and the strippers or cleaners of the rake.

2. I claim the combination of the spring B, rod E, and head lever F, as described.

3. I claim the rake-head O P, teeth I, and staples J, all constructed and arranged substantially as and for the purposes set forth.

EDGAR HUSON.

Witnesses:
SAMUEL J. PARKER,
F. J. McELHENY.